United States Patent [19]
Fujimoto

[11] Patent Number: 5,332,894
[45] Date of Patent: Jul. 26, 1994

[54] OPTICAL OUTPUT CONTROL IC AND OPTICAL INPUT AMPLIFIER IC

[75] Inventor: Takashi Fujimoto, Tokyo, Japan

[73] Assignee: NEC Corporation, Tokyo, Japan

[21] Appl. No.: 52,838

[22] Filed: Apr. 27, 1993

[30] Foreign Application Priority Data

May 6, 1992 [JP] Japan .................................. 4-113285
May 6, 1992 [JP] Japan .................................. 4-113286

[51] Int. Cl.$^5$ .............................................. H01J 40/14
[52] U.S. Cl. .................................. 250/208.2; 250/551
[58] Field of Search .......................... 250/551, 208.2; 359/154, 157, 164, 174, 180

[56] References Cited

U.S. PATENT DOCUMENTS 4,914,420 4/1990 Khan ..................................... 250/551
4,989,935 2/1991 Stein ..................................... 250/551

Primary Examiner—David C. Nelms
Assistant Examiner—K. Shami
Attorney, Agent, or Firm—Young & Thompson

[57] ABSTRACT

The invention provides an optical output control IC and a optical input amplifier IC for the E/O equipment of an optical parallel transmission system wherein only channels put to use can be driven and circuit driving current is prevented from flowing through the other channels which are not put to use. m parallel arrays of LED driver circuits $4_1$ to $4_m$ each including n LED driver circuits and one reference voltage supply circuit are accommodated in an LED driver IC. Power supply terminals VH 2 and VL 3 for supplying a clamp potential and a substrate potential respectively of LED driver IC 1, and circuit driving power supply terminals VA and VB for operating the circuits are provided separately for each parallel array, and power supply terminals VH 2 and VL 3 are provided in common to all of the circuits while driving power supply terminals VA $7_1$ to $7_m$ and VB $8_1$ to $8_m$ are provided independently for individual parallel arrays of LED driver circuit $4_1$ to $4_m$ so that driving power is supplied only to those parallel arrays of LED driver circuit of channels put to use. Separately, an optical input amplifier IC has driving power terminals VA $27_1$ to $27_m$ and VB $28_1$ to $28_m$ for operating circuits, which are constructed and operate quite similarly to those of the LED driver IC.

5 Claims, 4 Drawing Sheets

OPTICAL OUTPUT CONTROL IC AND OPTICAL INPUT AMPLIFIER IC

BACKGROUND OF THE INVENTION

1. Field of the Invention

This invention relates to an optical output control IC and an optical input amplifier IC for the E/O equipment of an optical parallel transmission system.

2. Description of Related Art

Conventionally, LED driver circuits IC are prepared for the maximum number of parallel channels of an optical parallel transmission system, and power is always supplied to all of the circuits.

The prior art is disadvantageous in that, since LED driver circuit IC and optical receiver circuit IC provide the circuits for the number of maximum capacity of parallel channels of an optical parallel transmission system and power is always supplied to all of the circuits in the ICs, even when some channels are not put on use, causing unnecessary power to be dissipated.

SUMMARY OF THE INVENTION

It is an object of the present invention to provide an optical output control IC and an optical input amplifier IC wherein circuit driving power is not supplied to any other circuit than to a number of LED driver circuits of the optical output control IC and of optical receiver circuits of the optical input amplifier IC equal to the number of transmission channels put to use.

According to one aspect of the present invention, there is provided an IC for use in an optical transmission system comprising a plurality of parallel arrays of functional circuits, means of supplying reference voltages of a high level and a low level to said functional circuits belonging to a selectively designated parallel array of said functional circuits and means for supplying the circuit driving power to each functional circuit belonging to said selectively designated parallel array of functional circuits.

According to another aspect of the present invention, there is provided an optical output control IC in the form of an LED driver IC comprising a plurality of parallel arrays of LED driver circuits, each of said parallel arrays of LED driver circuits including a plurality of LED driver circuits, a reference voltage supply circuit that supplies reference voltages of a high level and a low level to each LED driver circuits belonging to said parallel array of LED driver circuits, and means for supplying circuit driving power to each LED driver circuits belonging to the parallel array of LED driver circuit.

In the optical output control IC in the form of the LED driver IC, the means for supplying circuit driving power for each LED driver circuit may be included in the reference voltage supply circuit.

According to a further aspect of the present invention, there is provided an optical input amplifier IC in the form an optical receiver circuit IC, comprising a plurality of parallel arrays of optical receiver circuits, each of the parallel arrays of optical receiver circuits including a plurality of optical receiver circuits, a reference voltage supply circuit that supplies reference voltages of a high level and a low level to each optical receiver circuits belonging to the parallel array of optical receiver circuits and means for supplying circuit driving power to each optical receiver circuit belonging to the parallel array of optical receiver circuits.

In the optical input amplifier IC in the form of the optical receiver IC, the circuit driving power supplying means may be included in said reference voltage supply circuit.

Other and further objects, features and advantages of the invention will appear more fully from the following description.

DESCRIPTION OF THE PREFERRED EMBODIMENT

An embodiment of the present invention is described below with reference to the accompanying drawings.

Figure 1:
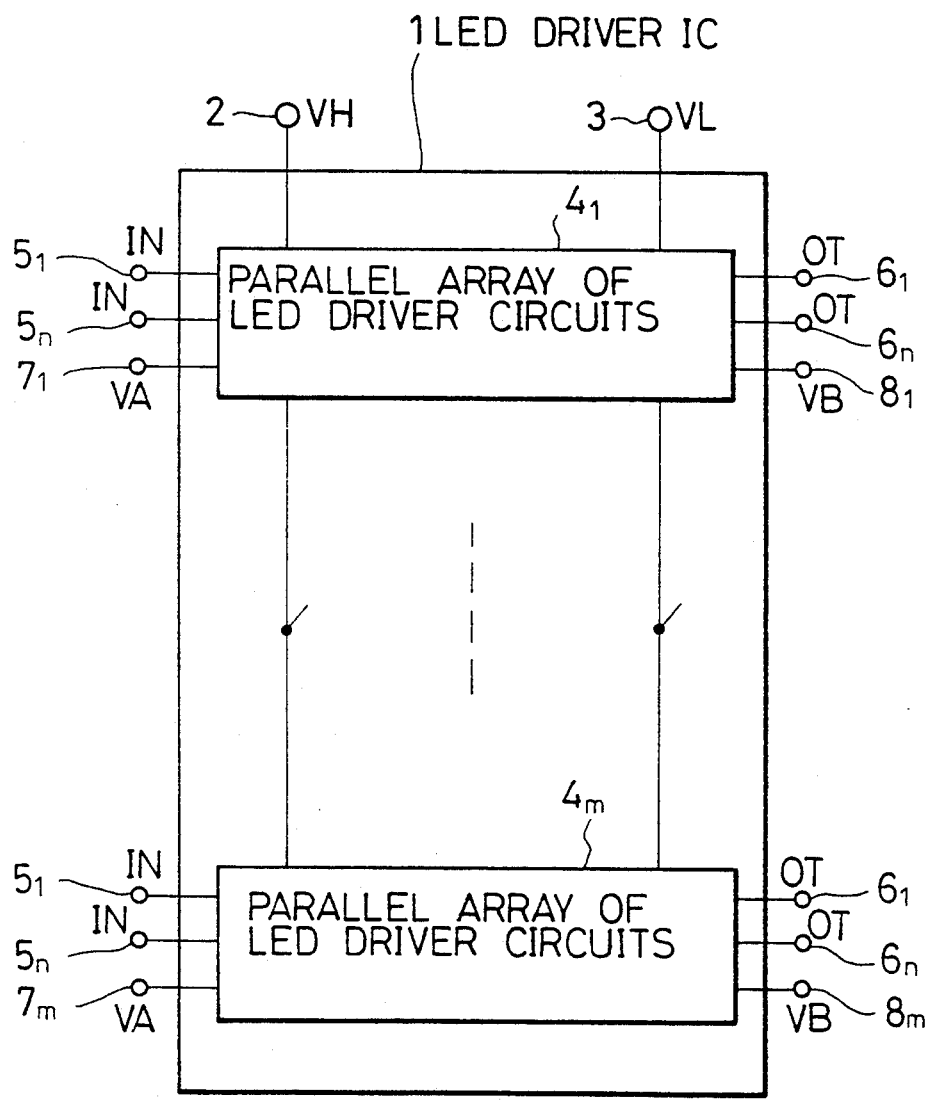
FIG. 1 is block diagram of an LED driver IC as an embodiment of the optical output control IC based on the present invention.
Figure 2:
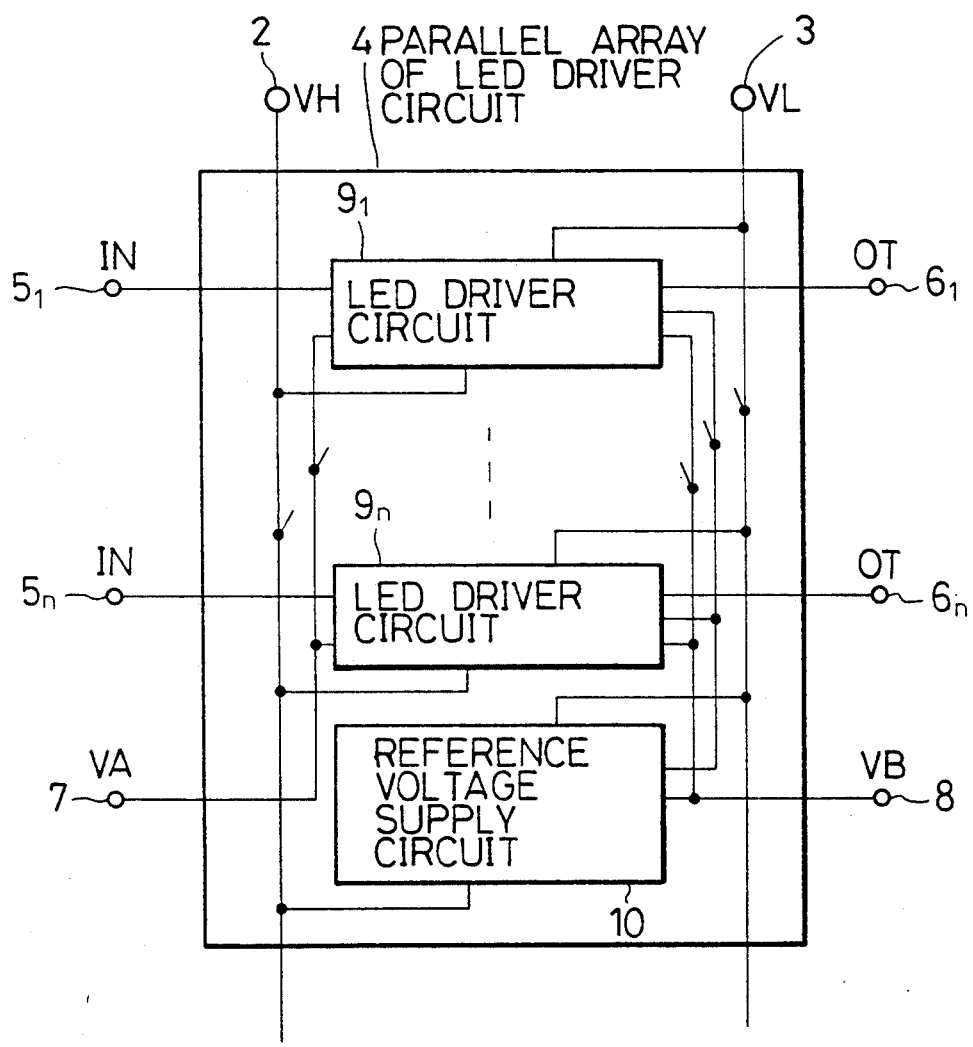
FIG. 2 is a block diagram of the parallel array of LED driver circuits shown in FIG. 1.

FIG. 1 is a block diagram of an LED driver IC as an embodiment of the optical output control IC based on the present invention, and FIG. 2 is a block diagram of a parallel array of LED driver circuits shown in FIG. 1.

Parallel array of LED driver circuits 4 includes n LED driver circuits $9_1$ to $9_n$, and one reference voltage supply circuit 10. n LED driver circuits $9_1$ to $9_n$ are connected in parallel to reference voltage supply circuit 10 and connected to respective input terminals (hereinafter referred to as input terminals IN) $5_1$ to $5_n$ and output terminals (hereinafter referred to as output terminals OT) $6_1$ to $6_n$. All of the reference voltage supply circuits of all parallel arrays of LED driver circuits $4_1$ to $4_m$, which constitute LED driver IC 1, are connected to common terminal (hereinafter referred to as power supply terminal VH) 2 which supplies a high level (clamp potential) of the IC and to another common power supply terminal (hereinafter referred to as power supply terminal VL) 3 which supplies a low level (substrate potential) to the IC. n LED driver circuits $9_1$ to $9_n$ and reference voltage supply circuit 10 which constitute each of parallel arrays of LED driver circuits $4_1$ to $4_m$ are connected in parallel to power supply terminals VH 2 and VL 3.

Operation of the present embodiment is described below. The LED driver IC includes m parallel LED driver circuits $4_1$ to $4_m$, which are individually driven by driving power supply terminals VA $7_1$ to $7_m$ and VB $8_1$ to $8_m$ which are connected to the inside of the respective parallel arrays of LED driver circuits.

When LED driver IC 1 is used for transmission of n×m channels, power is supplied to m driving power supply terminals VA $7_1$ to $7_m$ and VB $8_1$ to $8_m$ of the LED driver IC. When LED driver IC 1 is used for transmission number of channels between n×k and n×(k+1) channels (k+1 ≦ m), power is supplied to corresponding k+1 power supply terminals VA and power supply terminals VB of LED driver IC 1, but since circuit operation is not required for the circuits of n−{m−(k+1)} channels which are not applied for use, power supply terminals VA and VB may be connected, for example, to power supply terminal VL 3 so that current does not flow through the circuits which are not used.

Next, an embodiment of the optical input amplifier IC of the present invention is described with reference to the drawings.

Figure 3:
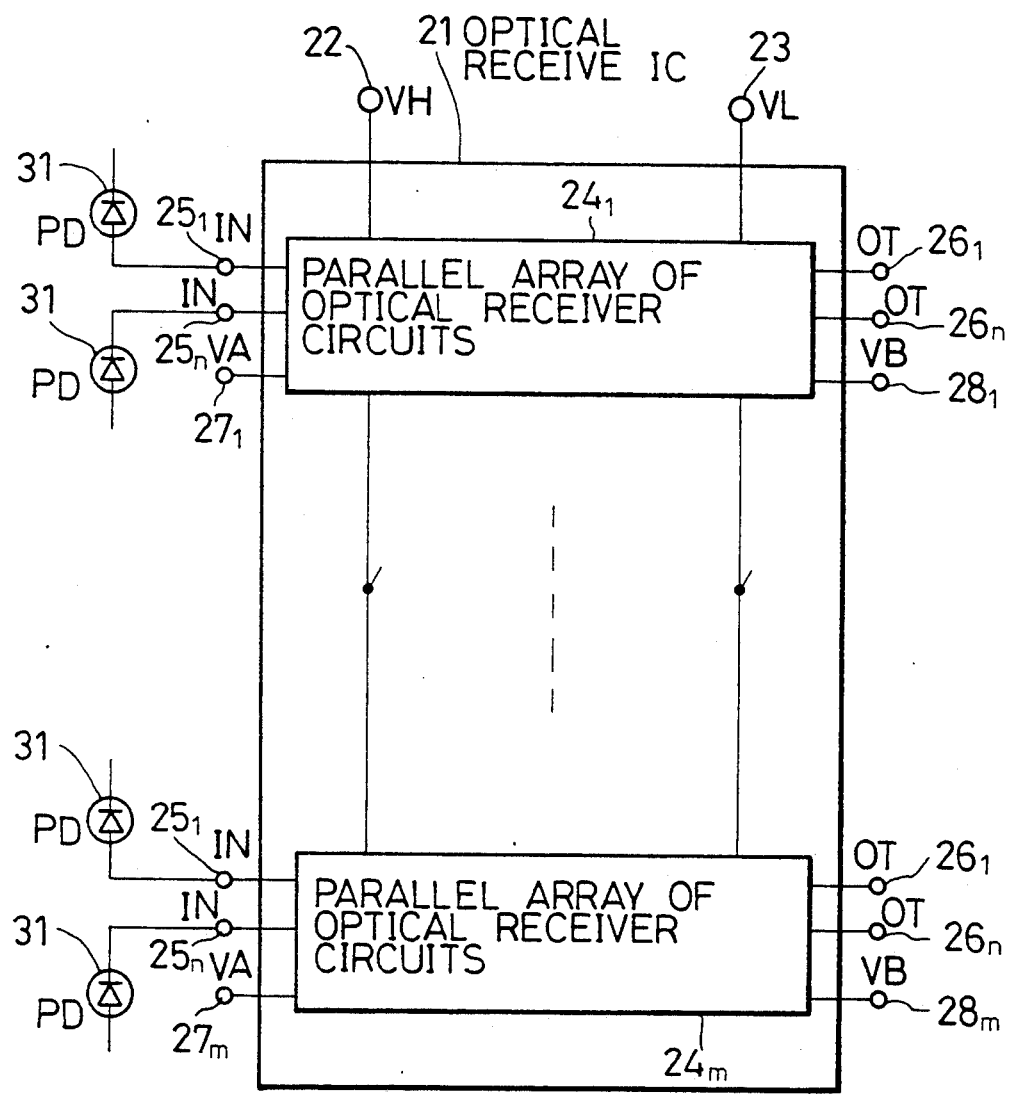
FIG. 3 is a block diagram of an optical receiver IC as an embodiment of the optical input amplifier circuit based on the present invention.
Figure 4:
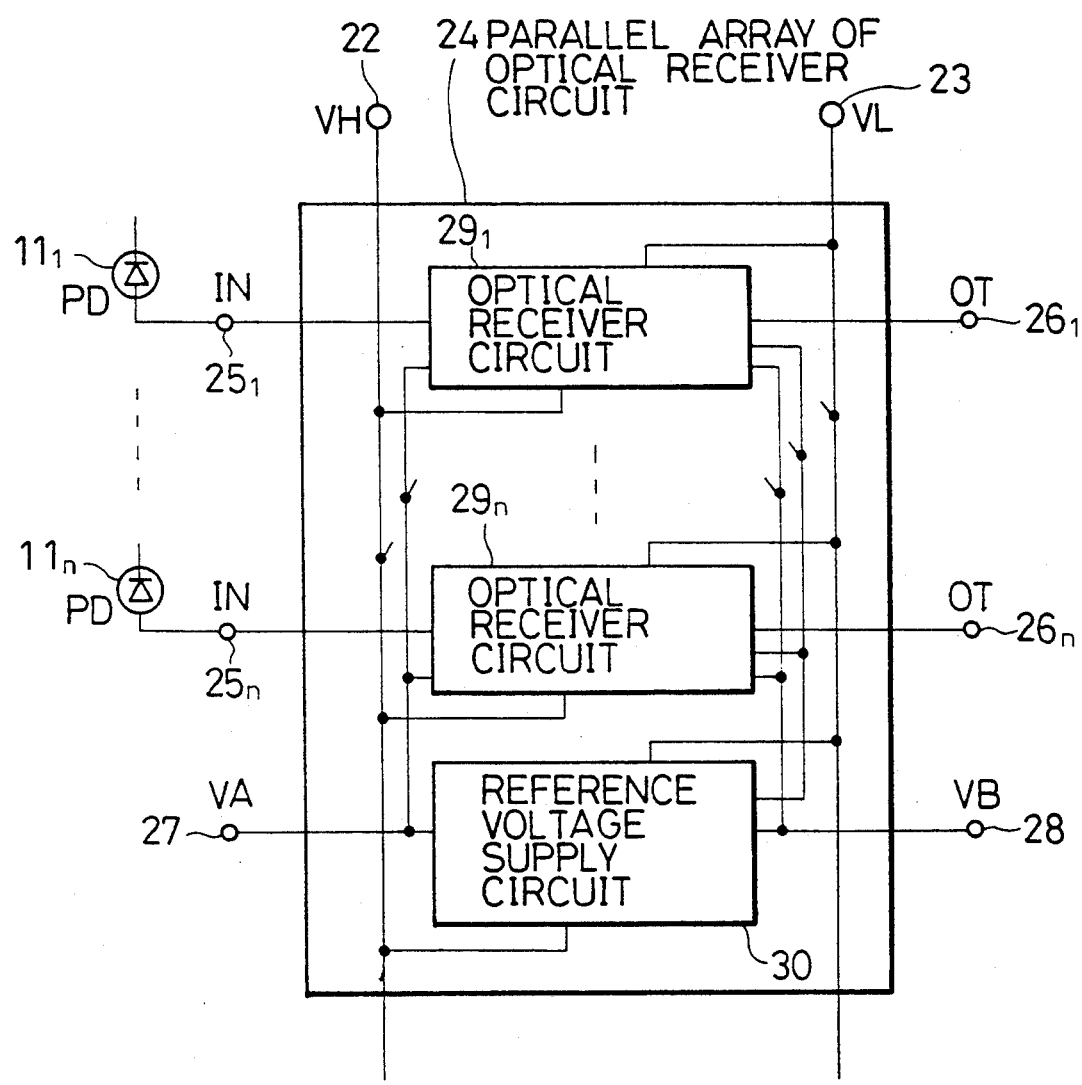
FIG. 4 is a block diagram of the parallel array of optical receiver circuits shown in FIG. 3.

FIG. 3 is a block diagram of an optical receiver IC as an embodiment of the optical input amplifier IC based on the present invention, and FIG. 4 is a block diagram of a parallel array of optical receiver circuits shown in FIG.

The parallel array of optical receiver circuits shown in FIG. 4 includes n optical receiver circuits $29_1$ to $29_n$ and one reference voltage supply circuit 30. n optical receiver circuits $29_1$ to $29_n$ are connected to reference voltage supply circuit 30 and individually connected to respective input terminals (hereinafter referred to input terminals IN) $25_1$ to $25_n$ and output terminals (hereinafter referred to as output terminals OT) $26_1$ to $26_n$. Input terminals IN $25_1$ to $25_n$ are connected to the anodes of photodiodes (hereinafter referred to as PD ) $31_1$ to $31_n$, respectively.

Referring to FIG. 3, the reference voltage supply circuits of all the optical receiver circuits, which constitute optical receiver IC 21, are connected to common voltage supply terminal VH 22 for supplying a high level (clamp potential) to the IC and to another common voltage supply terminal VL 23 for supplying a low level (substrate potential) to the IC. n optical receiver circuits $29_1$ to $29_n$ and one reference voltage supply circuit 30, which constitute each parallel array of optical receiver circuits $24_1$ to $24_m$, are connected in parallel to driving power supply terminals VA 27 and VB 28.

Operation of this embodiment is described below with reference to FIGS. 3 and 4.

When optical receiver IC 21 is used for transmission of n×m channels, power is supplied to m driving power supply terminals VA $27_1$ to $27_m$ and VB $28_1$ to $28_m$ of the optical receiver IC. When optical receiver IC 21 is used for transmission of number of channels between n×k and n×(k+1) channels (k+1 ≦ m), power is supplied to corresponding k+1 driving power supply terminals VA and VB of optical receiver IC 21, but since circuit operation is not required for the circuits of n×{m−(k+1)}channels which are not put to use, power supply terminals VA and VB of the circuits may be connected, for example, to power supply terminal VL 23 so that current does not flow through the circuits which are not used.

What is claimed is:

1. An IC for use in an optical transmission system comprising:
   a plurality of parallel arrays of functional circuits;
   means for supplying reference voltages of a high level and a low level to said functional circuits belonging to selectively designated parallel array of said functional circuits and
   means for supplying circuit driving power to each functional circuits belonging to said selectively designated parallel arrays of functional circuits.

2. An optical output control IC in the form of an LED driver IC, said optical output control IC comprising:
   a plurality of parallel arrays of LED driver circuits, each of said parallel array of LED driver circuits including a plurality of LED driver circuits, a reference voltage supply circuit that supplies reference voltages of a high level and a low level to each LED driver circuits belonging to said parallel array of LED driver circuits and means for supplying circuit driving power to each LED driver circuits belonging to said parallel array of LED driver circuits.

3. An optical output control IC in the form of the LED driver IC as claimed in claim 2, wherein said means for supplying circuit driving power to each LED driver circuit is included in said reference voltage supply circuit.

4. An optical input amplifier IC in the form of an optical receiver IC, said optical input amplifier IC comprising:
   a plurality of parallel array of optical receiver circuits, each of said parallel array of optical receiver circuits includes a plurality of optical receiver circuits, a reference voltage supply circuit that supplies reference voltages of a high level and a low level to each optical receiver circuits belonging to said parallel array of optical receiver circuits and means for supplying circuit driving power to each optical receiver circuit belonging to said parallel array of optical receiver circuits.

5. An optical input amplifier IC in the form of the optical receiver IC claimed in claim 4, wherein said means for supplying circuit driving power to each optical receiver circuit is included in said reference voltage supply circuit.

* * * * *